Figure 1:
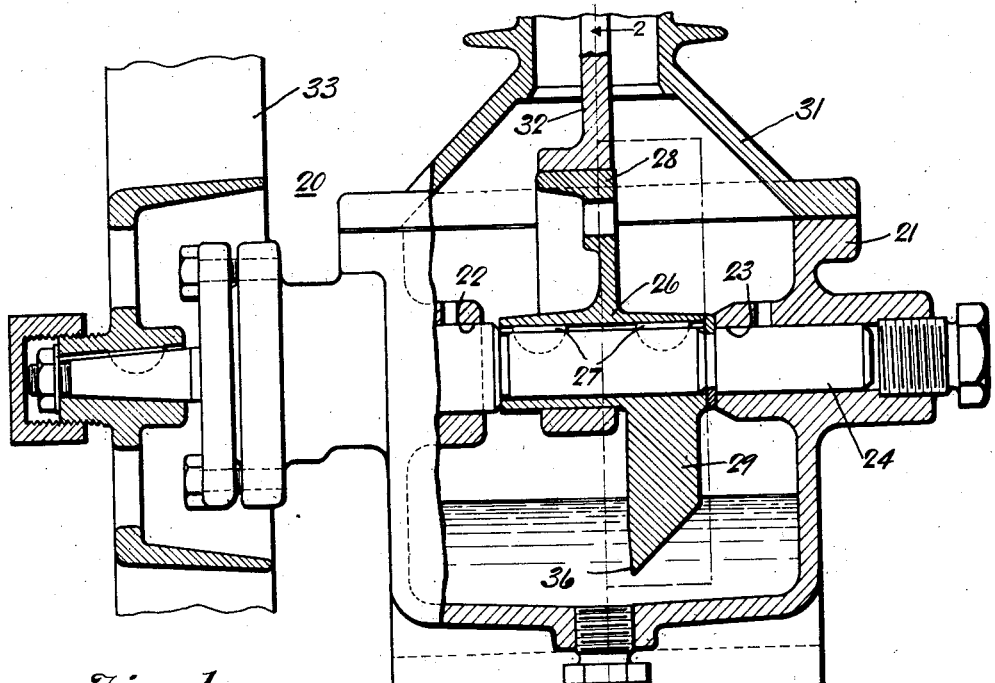

Oct. 9, 1928.  W. E. SHEW  1,687,395

REFRIGERATING APPARATUS

Filed July 21, 1926

Inventor
Walter E. Shew
By Spencer Sewall & Hardman
his Attorneys

Patented Oct. 9, 1928.

1,687,395

UNITED STATES PATENT OFFICE.

WALTER E. SHEW, OF DAYTON, OHIO, ASSIGNOR TO DELCO-LIGHT COMPANY, OF DAYTON, OHIO, A CORPORATION OF DELAWARE.

REFRIGERATING APPARATUS.

Application filed July 21, 1926. Serial No. 123,921.

The present invention relates to reciprocating compressors, and particularly to compressors having a counterbalance carried by the operating shaft for counterbalancing the crank arm, or eccentric, and which is adapted to be immersed in lubricant within the crankcase.

It is the usual practice, particularly in refrigerating systems, to admit refrigerant into the crankcase of a compressor and utilize the suction effect of the piston for drawing the medium, to be compressed, from the crankcase to the compression chamber of the compressor. It is also desirable to utilize a counterbalance for the eccentric, or crank arm, to eliminate vibrations. Furthermore, in order to minimize vibration, it is desirable to locate the crankshaft of the compressor adjacent the support of the compressor and one manner of carrying this out is to locate the crankshaft as near as possible to the base. When this is done, only a small space is provided between the crankshaft and the bottom of the crankcase. Therefore, when a counterbalance is provided, said counterbalance will be immersed in the lubricant to a relatively great degree. Heretofore it has been impractical to utilize a counterbalance in a crankcase when the above conditions were present because the counterbalance, when suddenly striking the lubricant, would splash the lubricant to such a degree so as to cause an excessive amount thereof to be delivered to the cylinder walls, which lubricant leaks by the piston and enters the compression chamber. Also an excessive amount of lubricant might pass through the inlet valve to the compression chamber and prevent the proper operation of the compressor.

One of the objects of the present invention is to eliminate excessive splashing of lubricant while preserving the before mentioned desirable advantages. One manner of carrying out this object is to construct a counterbalance which moves into the lubricant, in such a manner that it will not cause excessive splashing of said lubricant.

Further objects and advantages of the present invention will be apparent from the following description, reference being had to the accompanying drawings, wherein a preferred form of the present invention is clearly shown.

Figure 2:
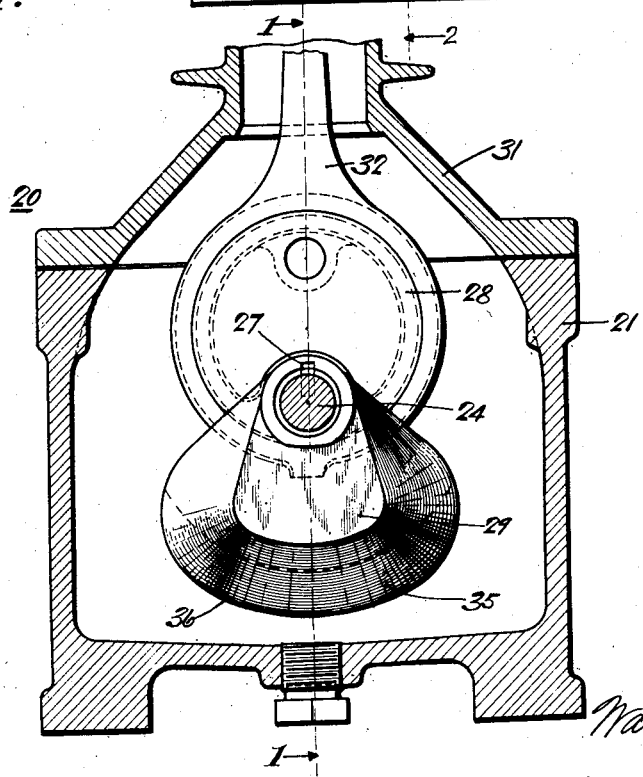

In the drawings:

Fig. 1 is a partly elevational and partly sectional view of a compressor showing the improved counterbalance, the section being taken on line 1—1 of Fig. 2; and Fig. 2 is a sectional view taken on line 2—2 of Fig. 1.

Referring to the drawings, 20 indicates a compressor having a crankcase 21 which forms a lubricant reservoir. Crankcase 21 is provided with bearings 22 and 23 in which is journalled a crankshaft 24. A member 26 is keyed to the crankshaft 24 by keys 27, and comprises an eccentric 28 and a counterbalance 29. A cylinder 31 is carried above the crankcase 21 and receives a piston (not shown) which is connected by eccentric strap 32 with the eccentric and adapted to be reciprocated thereby. Crankshaft 24 extends through a wall of the crankcase and is driven by a pulley 33.

To augment the counterbalancing effect of the counterbalance 29 of eliminating vibration it is desirable to locate the crankshaft adjacent the support for or the base of the compressor. When this is done, only a relatively small space is provided between the crankshaft and the bottom of the crankcase. Consequently, the counterbalance will immerse within the lubricant in said crankcase at every revolution thereof. In order to prevent the lubricant from splashing excessively, which would cause an excessive amount of lubricant to be delivered to the compression chamber of the compressor, that portion of the counterbalance which strikes the lubricant or the outer periphery thereof is beveled, as at 35, to provide a knife-edge 36 on the extreme outer periphery. The function of this knife-edge 36 is to slice or cut the lubricant when the counterbalance is being immersed without splashing said lubricant excessively, a non-splashing wedge-like entry of the counterbalance being thus effected. This improves the efficiency of the compressor and prolongs the life thereof, because no excessive quantity of lubricant will be delivered to the compression chamber, which excessive quantity would in effect cause increase in pumping of lubricant and a decrease in compression of the medium to be compressed. Also, if a compressor is constructed for the pumping of gaseous medium, the life thereof, particularly that of the valves, is prolonged. If lubricant is pumped by a compressor, designed for efficient gas-compressing, the valve thereof will be quickly distorted. However, since no excessive lubricant is pumped by the compressor, that defect is eliminated.

While the form of embodiment of the invention as herein disclosed, constitutes a preferred form, it is to be understood that other forms might be adopted, all coming within the scope of the claims which follow.

What is claimed is as follows:

1. In a compressor for refrigerators, a crankcase adapted to contain a quantity of lubricant, and a crankshaft carrying a counterbalance adapted to be immersed within the lubricant, the outer periphery of said counterbalance having an edge adapted to effect a non-splashing wedge-like entrance into the body of said lubricant.

2. In a compressor for refrigerators, a crankcase adapted to contain a quantity of lubricant, and a crankshaft carrying a counterbalance adapted to be immersed within the lubricant, the outer periphery of said counterbalance being of knife-edged contour and adapted to effect a gradual non-splashing wedge-like entry into the body of said lubricant.

In testimony whereof I hereto affix my signature.

WALTER E. SHEW.